(No Model.)
L. C. SPRINGER.
PIPE WRENCH.
No. 602,590. Patented Apr. 19, 1898.
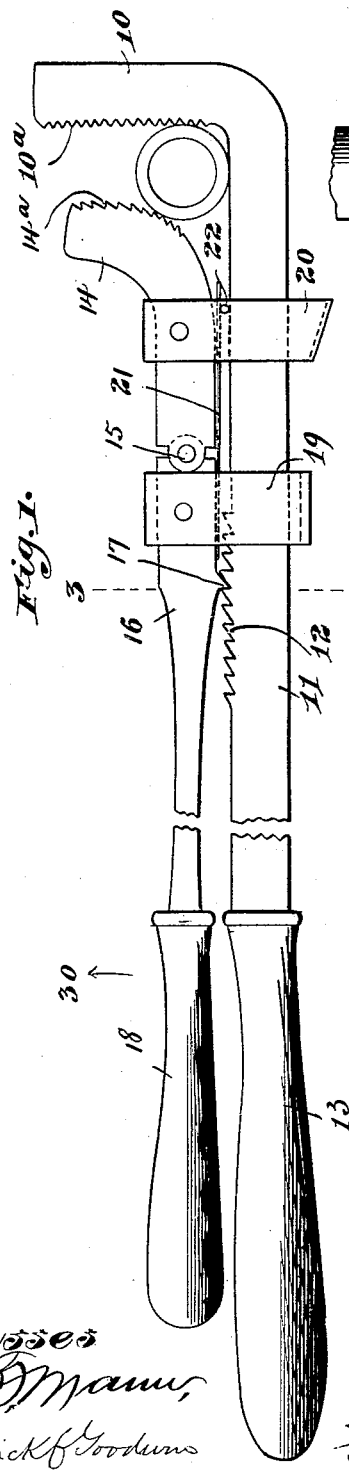
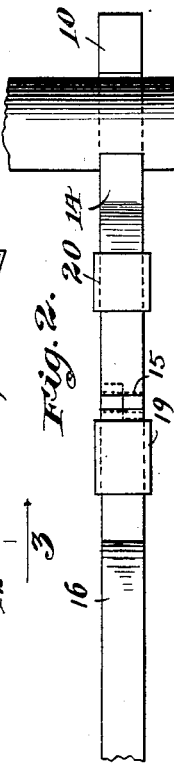
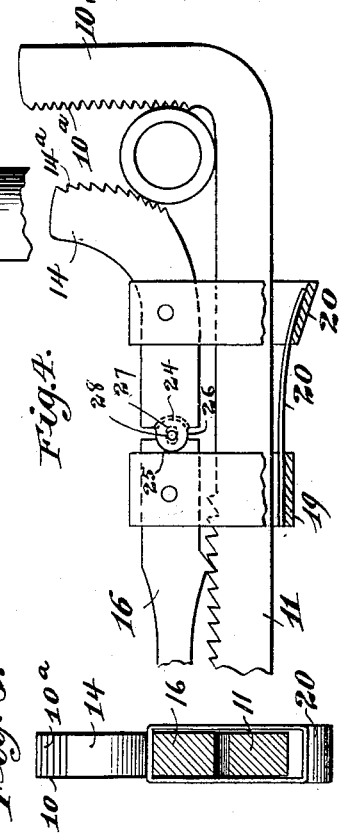
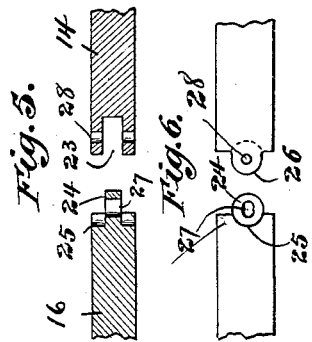
Witnesses
Inventor,
Loris C. Springer,
By Offield, Towle & Linthicum,
Attys.
THE NORRIS PETERS CO., PHOTO-LITHO., WASHINGTON, D. C.

UNITED STATES PATENT OFFICE.

LORIN C. SPRINGER, OF CHICAGO, ILLINOIS.

PIPE-WRENCH.

SPECIFICATION forming part of Letters Patent No. 602,590, dated April 19, 1898.

Application filed November 4, 1897. Serial No. 657,342. (No model.)

*To all whom it may concern:*

Be it known that I, LORIN C. SPRINGER, of Chicago, in the county of Cook and State of Illinois, have invented certain new and useful Improvements in Pipe-Wrenches, of which the following is a specification.

This invention relates to pipe-wrenches, and has for its object to provide a wrench, adapted to grasp and firmly hold pipes, tubes, rods, or other objects of circular or approximately circular cross-section, which shall be simple and efficient in construction, capable of being quickly adjusted to accommodate itself to objects of various sizes, and which may be produced at a small cost.

To these ends my invention consists in certain novel features of construction, which will be hereinafter described, and then particularly pointed out in the claims.

In the accompanying drawings, Figure 1 is a side elevation of a wrench embodying my invention in one form. Fig. 2 is an edge view of the same. Fig. 3 is a sectional view taken on the line 3 3 of Fig. 1 and looking in the direction of the arrow. Fig. 4 is a view similar to Fig. 1, illustrating a modified construction; and Figs. 5 and 6 are detail views illustrative of a feature of the construction shown in Fig. 4.

In the said drawings, 10 indicates the fixed jaw of the wrench, formed in one piece with or secured to a shank 11, said jaw extending, preferably, at about a right angle to the shank and being provided with a serrated working surface 10$^a$. The shank 11 is provided at about the middle of its length with a ratchet 12 on the same edge on which the jaw 10 is located, and said shank is also desirably provided with a handle 13 for convenience in using the wrench.

14 indicates the movable jaw of the wrench, which is provided with a serrated working face 14$^a$, normally inclined with relation to or forming an angle with the working face of the jaw 10.

The movable jaw 14 is pivoted at 15 to a shank 16, extending in a direction substantially parallel with the shank 11 of the fixed jaw, and having a tooth 17, which is adapted to engage with the ratchet 12 of the said shank 11. The shank 16 is also desirably provided with a handle 18, located adjacent to the handle 13 of the shank 11, so that the two handles may be readily grasped and held together at the same time by the operator in one hand.

A keeper or loop 19, secured to the shank 16 and passing around the shank 11, serves to prevent separation of these parts, while at the same time it allows said shank 16 sufficient play relatively to the shank 11 to permit the tooth 17 thereof to be disengaged from and held clear of the ratchet 12 when it is desired to move the shank 16 and the movable jaw 14, pivoted thereto, bodily along the shank 11 toward or from the fixed jaw 10. The movable jaw 14 is provided with a similar loop or keeper 20, also passing around the shank 11 and allowing sufficient play to permit said movable jaw to turn on its pivot 15 sufficiently to accommodate minor differences of size in the object to be grasped.

The keeper or loop 20 limits the motion of the movable jaw 14 around its pivot in a direction away from the shank 11, and said movable jaw is forced normally toward said shank 11 by means of a spring 21. In Fig. 1 of the drawings I have shown this spring as located between the shank 11 on the one side and the movable jaw 14 and its shank 16 on the other, the spring being secured at one end to the shank 16, while its other or free end bears against a pin 22, carried by the loop 20. This spring may, however, be otherwise located, and in Fig. 4 I have shown this feature of the construction in a modified form, the spring being located on the opposite side of the shank 11 and being secured to the loop 19 and bearing with its free end against the loop 20. I have also shown in Figs. 4, 5, and 6 a construction which I prefer for pivotally connecting the movable jaw 14 to its shank 16. In this construction the end of the jaw 14 is slotted, as shown at 23, to receive a corresponding projection 24 on the end of the shank 16, and said end of the shank is provided with curved seats 25 to receive the correspondingly-curved shoulders 26 on the end of the movable jaw. The apertures 27, through which the pivotal pin passes in the shank, are elongated, so that when said pivot-pin is passed through said elongated apertures and through the apertures 28 in the shoulders of the movable jaw the thrust imparted to the movable jaw, when the same is forced against the pipe or other article, will not come upon the pivot-pin, but will be borne by the shoulders 26 and seats 25, and will thus prevent the pivot-pin from wearing or breaking.

The wrench thus described operates in the following manner: The fixed jaw 10 being placed against the pipe or other object the movable jaw may be brought into contact with the object by sliding said movable jaw and its shank along the shank 11 of the fixed jaw toward the movable jaw and the object to be grasped. The spring 21 will hold the movable jaw in contact with the object, and the wrench being moved in the direction indicated by the arrow 30 in Fig. 1 the object will be firmly grasped between the serrated jaws of the wrench. To release the object or to obtain a sufficient space to receive the object between the jaws, it is only necessary to move the shank 16 away from the shank 11, by means of its handle, to a sufficient extent to disengage the tooth 17 from the ratchet 12, when the movable jaw and its shank may be slid along the shank of the fixed jaw, away from this latter, to the desired extent. Upon reëngaging the tooth 17 with the ratchet 12 the shank of the movable jaw is again locked to cause said movable jaw to engage with the object. In operating the wrench after its jaws have engaged the object both of the handles or shanks thereof are grasped in one hand by the operator, and the shank of the movable jaw is thus held engaged with the shank of the fixed jaw by the engagement of its tooth with the ratchet thereof, so that the mere act of holding the wrench while operating it secures the fixity of the shank of the movable jaw and prevents its disengagement while the wrench is in actual use.

It will be seen that the wrench may be readily and quickly adjusted to grasp any object within its range and is simple in construction, so that it may be produced at a relatively small cost. No set-screws or adjusting-screws are employed, and the wrench is automatically set and locked by merely sliding the movable jaw toward the fixed jaw and may be as readily unlocked and disengaged.

I claim—

1. In a pipe-wrench, the combination, with a fixed jaw having a shank having a stem or handle portion and provided with a ratchet, of a movable jaw, means for supporting and guiding said movable jaw on the shank of the fixed jaw, and a second shank pivoted to the movable jaw, provided with a loop or keeper loosely embracing the shank of the fixed jaw, and with a tooth to engage the ratchet thereof, and having a stem or handle adjacent to and substantially parallel with the stem or handle portion of the shank of the fixed jaw, substantially as described.

2. In a pipe-wrench, the combination, with a fixed jaw having a shank having a stem or handle portion and provided with a ratchet, of a movable jaw provided with a loop or keeper loosely embracing the shank of the fixed jaw, and limiting its motion away from said shank, a spring to force said loose jaw normally toward the shank of the fixed jaw, and a second shank pivoted to the movable jaw, provided with a loop or keeper loosely embracing the shank of the fixed jaw, and with a tooth to engage the ratchet thereof, and having a stem or handle adjacent to and substantially parallel with the stem or handle portion of the shank of the fixed jaw, substantially as described.

LORIN C. SPRINGER.

Witnesses:
FREDERICK C. GOODWIN,
IRVINE MILLER.